(12) United States Patent
Sood et al.

(10) Patent No.: US 11,723,115 B2
(45) Date of Patent: Aug. 8, 2023

(54) WLAN DECODABILITY-BASED FRAME PROCESSING FOR POWER SAVING

(71) Applicant: Cypress Semiconductor Corporation, San Jose, CA (US)

(72) Inventors: Ayush Sood, Bangalore (IN); Suprojit Mukherjee, Kalyani (IN); Prasanna Kumar Sethuraman, Bangalore (IN); Sri Ramya Thota, Bangalore (IN); Kalaivani K, Bengaluru (IN)

(73) Assignee: Cypress Semiconductor Corporation, San Jose, CA (US)

( * ) Notice: Subject to any disclaimer, the term of this patent is extended or adjusted under 35 U.S.C. 154(b) by 9 days.

(21) Appl. No.: 16/913,282

(22) Filed: Jun. 26, 2020

(65) Prior Publication Data
US 2021/0410225 A1 Dec. 30, 2021

(51) Int. Cl.
*H04W 84/12* (2009.01)
*H04L 69/22* (2022.01)
*H04L 25/02* (2006.01)
*H04L 27/26* (2006.01)

(52) U.S. Cl.
CPC ......... *H04W 84/12* (2013.01); *H04L 25/0204* (2013.01); *H04L 27/2613* (2013.01); *H04L 69/22* (2013.01)

(58) Field of Classification Search
CPC . H04L 25/0204; H04L 27/2613; H04L 69/22; H04L 1/0036; H04L 27/2666; H04L 69/323; H04L 1/0045; H04W 84/12; H04W 52/0241; H04W 12/106; H04W 28/0221; H04W 28/065; H04W 52/0206; Y02D 30/70

See application file for complete search history.

(56) References Cited

U.S. PATENT DOCUMENTS

| | | | | |
|---|---|---|---|---|
| 7,403,511 | B2* | 7/2008 | Liang | H04W 52/0238 370/278 |
| 2012/0044925 | A1* | 2/2012 | Lee | H04W 52/0241 370/338 |
| 2014/0247838 | A1* | 9/2014 | Seok | H04L 5/0091 370/476 |
| 2014/0307602 | A1* | 10/2014 | Seok | H04W 52/0216 370/311 |
| 2014/0348148 | A1* | 11/2014 | You | H04W 56/00 370/338 |
| 2016/0165524 | A1* | 6/2016 | Kim | H04W 52/02 370/338 |
| 2016/0227489 | A1* | 8/2016 | Oteri | H04W 52/12 |
| 2017/0033965 | A1* | 2/2017 | Trainin | H04W 52/0229 |
| 2017/0126363 | A1* | 5/2017 | Wang | H04L 1/1607 |
| 2017/0230149 | A1* | 8/2017 | Wang | H04L 1/1614 |
| 2017/0310424 | A1* | 10/2017 | Chun | H04L 69/324 |
| 2018/0124746 | A1* | 5/2018 | Choi | H04L 5/0044 |

\* cited by examiner

*Primary Examiner* — Khaled M Kassim
*Assistant Examiner* — Kai Chang

(57) ABSTRACT

Methods, apparatus and systems are disclosed for receiving an IEEE 802.11 frame at a WLAN station, determining whether the frame is decodable and addressed to the WLAN station, and entering a reduced power state if the frame is not decodable or not addressed to the WLAN station.

21 Claims, 8 Drawing Sheets

WLAN DECODABILITY-BASED FRAME PROCESSING FOR POWER SAVING

FIELD

The present disclosure is related to wireless local area networks (WLANs) in general, and more particularly to methods and systems for validating the integrity of WLAN frames and their intended destination before energy is expended to decode the frame.

BACKGROUND

Receiving stations in WLAN systems validate a physical layer convergence protocol (PLCP) header to determine if a WLAN frame should be decoded. The validation process computes a checksum of the received header and compares the computed checksum with a checksum embedded in the header. If the PLCP header passes this validation step, then the physical (PHY) layer attempts to further process the frame, but doesn't determine if the frame has sufficient signal integrity to be decoded, or if the frame is even intended for the station that receives the frame. As a result, frames that pass conventional PLCP header validation are decoded, and the decoded bits are passed to the MAC (Medium Access Control) layer, which may discard the frame because of a frame check sequence (FCS) error or a determination that the frame is not addressed to the receiving station. As a result, any time and energy expended in decoding the frame is wasted.

SUMMARY

Systems, apparatus and methods for WLAN frame processing are disclosed. In one example, a method in a WLAN station includes receiving an IEEE 802.11 frame at a WLAN station, determining whether the frame is decodable and addressed to the WLAN station, and entering a reduced power state if the frame is not decodable or not addressed to the WLAN station.

In one example, determining whether the frame is decodable includes performing signal integrity checks of a physical (PHY) layer convergence protocol (PLCP) header of the frame, and determining whether a combination of parameters in a signaling (SIG) field of the PLCP header is valid.

In one example, performing signal integrity checks of the physical (PHY) layer convergence protocol (PLCP) header includes one or more of: determining whether a signal-to-noise ratio (SNR) computed on a signaling field of the PLCP header is below a predetermined minimum SNR value required to decode data packets at any data rate; determining whether the signal-to-noise ratio (SNR) computed on a signaling field of the PLCP header is below a predetermined minimum SNR value required to decode data packets based on a modulation and coding scheme (MCS), a number of spatial streams (NSS) and a space-time block coding (STBC) configuration of the spatial streams; determining from a channel estimate whether an RMS (root mean square) delay spread exceeds a predetermined maximum RMS delay spread; and determining whether a channel condition number based on the channel estimate can support a data rate based on the MCS, the NSS and the STBC configuration.

In one example, an invalid combination of parameters in the signaling field of the PLCP header includes one or more of: an invalid rate field combination in a legacy signaling (L-SIG) field; a mismatch between a number of spatial streams (NSS) field and a space-time block coding (STBC) field in a high throughput signaling (HT-SIG) field; and a mismatch between a single-user (SU) field and a group ID (GID) field in a very high throughput signaling (VHT-SIG) field.

In one example, determining whether the frame is addressed to the WLAN station includes determining whether the WLAN station is a member of a basic service set (BSS) identified by a basic service set identifier (BSSID) in a Medium Access Control (MAC) header of the frame, and determining whether a receiver address (RA) in the MAC header of the frame matches a MAC address of the WLAN station.

In one example, entering the reduced power state includes entering one of a sleep state or a nap state for a remaining duration of the WLAN frame, based on a frame duration field in the MAC header.

In one example, entering the nap state includes duty-cycling a PHY/RF data path for the remaining duration of the frame, and wherein entering the sleep state comprises powering down the PHY/RF data path for the remaining duration of the frame.

In one example, a WLAN controller includes a processor and a memory coupled with the processor. Where, when the processor executes instructions stored in the memory, the WLAN controller is configured to receive an IEEE 802.11 frame, determine whether the frame is decodable and addressed to the WLAN controller, and to enter a reduced power state if the frame is not decodable or not addressed to the WLAN controller.

In one example, a system includes at least one antenna to receive an IEEE 802.11 frame, and a WLAN controller coupled with the antenna, where the controller includes a processor configured to determine whether the frame is decodable and addressed to the WLAN controller; and to enter a reduced power state if the frame is not decodable or not addressed to the WLAN controller.

DETAILED DESCRIPTION

Figure 1:
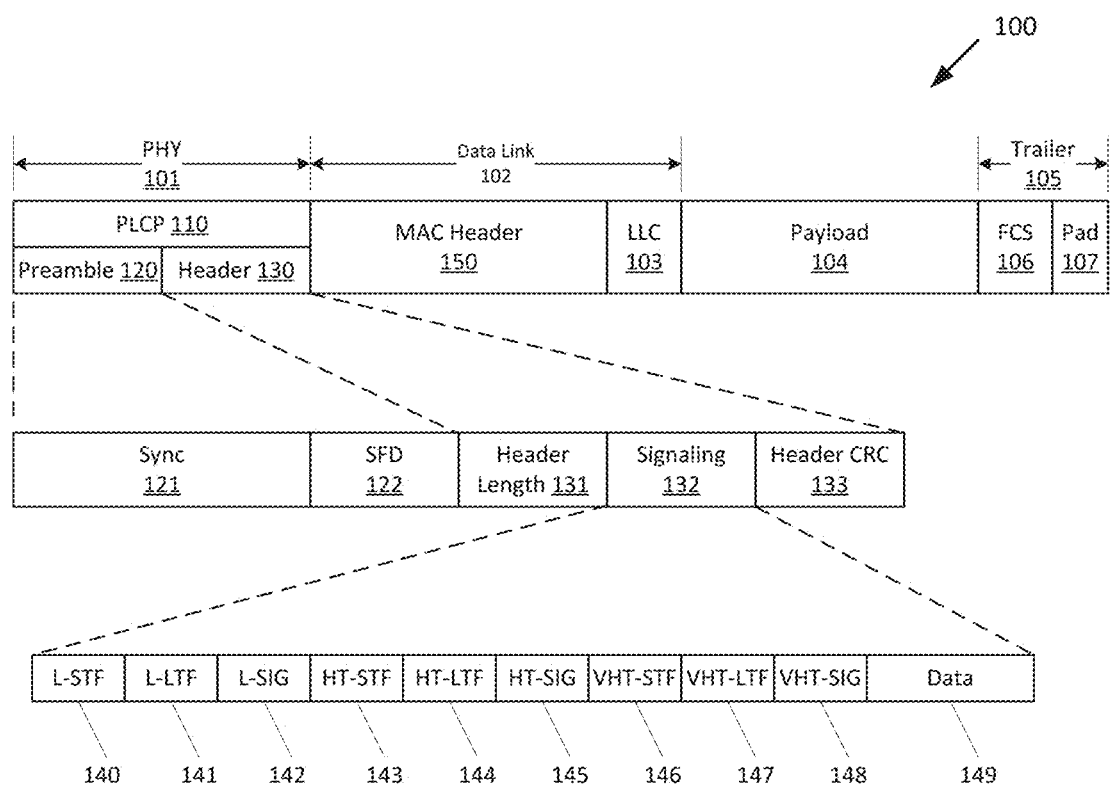
FIG. 1 is a datagram illustrating an example WLAN frame and a physical (PHY) layer subframe within the frame according to the present disclosure.

Systems, apparatus and methods for WLAN frame processing with power saving are disclosed. FIG. 1 is a datagram illustrating an example IEEE 802.11ac WLAN frame 100. Frame 100 includes a physical (PHY) layer 101, a data link layer 102, a payload field 104, and a trailer 105 consisting of a frame check sequence (FCS) 106 and padding bits (Pad) 107. The PHY layer 101 comprises a physical layer convergence protocol (PLCP) field 110, which includes a PLCP preamble 120 and a PLCP header 130. The data link layer 102 includes a medium access control (MAC) layer 150 and an optional logical link control layer (LLC) 103.

As illustrated in FIG. 1, the PLCP preamble 120 includes a synchronization (Sync) field 121 and an SFD (start of frame delimiter) 122. The PLCP header 130 includes a header length field 131, a signaling field 132, and a header CRC (cyclic redundancy check) field 133.

Further illustrated in FIG. 1 is the structure and content of the signaling field 132. Signaling field 132 includes a legacy short training field (L-STF) 140, a legacy long training field (L-LTF) 141, a legacy signaling field (L-SIG) 142, a high throughput short training field (HT-STF) 143, a high throughput long training field (HT-LTF) 144, a high throughput signaling field (HT-SIG) 145, a very high throughput short training field (VHT-STF) 146, a very high throughput long training field (VHT-LTF) 147, a very high throughput signaling field (VHT-SIG) 148, and a data field 149.

The frame structure described above is part of the IEEE 802.11ac Standard, and is not described in detail here, except to note that the legacy (L) fields (140-142) provide backward compatibility for IEEE 802.11b/ag compatible devices, the high throughput (HT) fields (143-145) provide backward compatibility for IEEE 802.11n devices, and the very high throughput (VHT) fields provide backward compatibility for IEEE 802.11ac devices.

Figure 2:
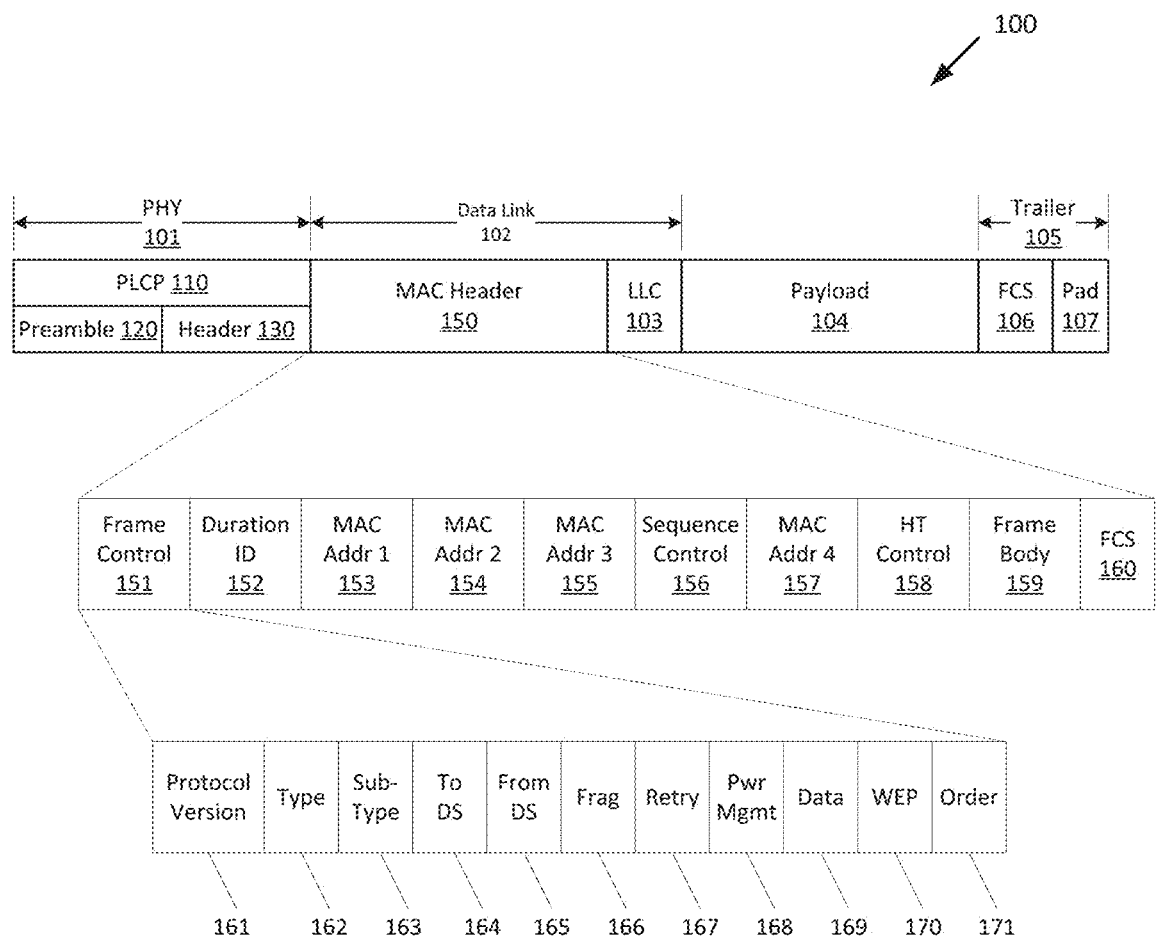
FIG. 2 is a datagram illustrating an example WLAN frame and a data link sublayer within the frame according to the present disclosure.

FIG. 2 illustrates the example IEEE 802.11ac WLAN frame 100 with additional details of the MAC header 150. MAC header 150 includes a frame control field 150, a duration identifier (ID) field 152, a MAC address 1 field 153, a MAC address 2 field 154, a MAC address 3 field 155, a sequence control field 156, a MAC address 4 field 157, a high throughput control field 158, a frame body 159, and a frame check sequence (FCS) field 160.

As illustrated in FIG. 2, the frame control field 151 includes a protocol version field 161, a frame type field 162, a frame sub-type field 163, a "to DS" field 164 and a "from DS" field 165 (used to interpret the address fields 153, 154, 155 and 157 in the MAC header), a fragment number field 166, a retry (retransmission) field 167, a power management field 168, a data field 169, a WEP (encryption) field 170, and an order field 171. As in the case of FIG. 1, all of these fields are defined in the IEEE 802.11 standards and are not described in detail here.

Figure 3:
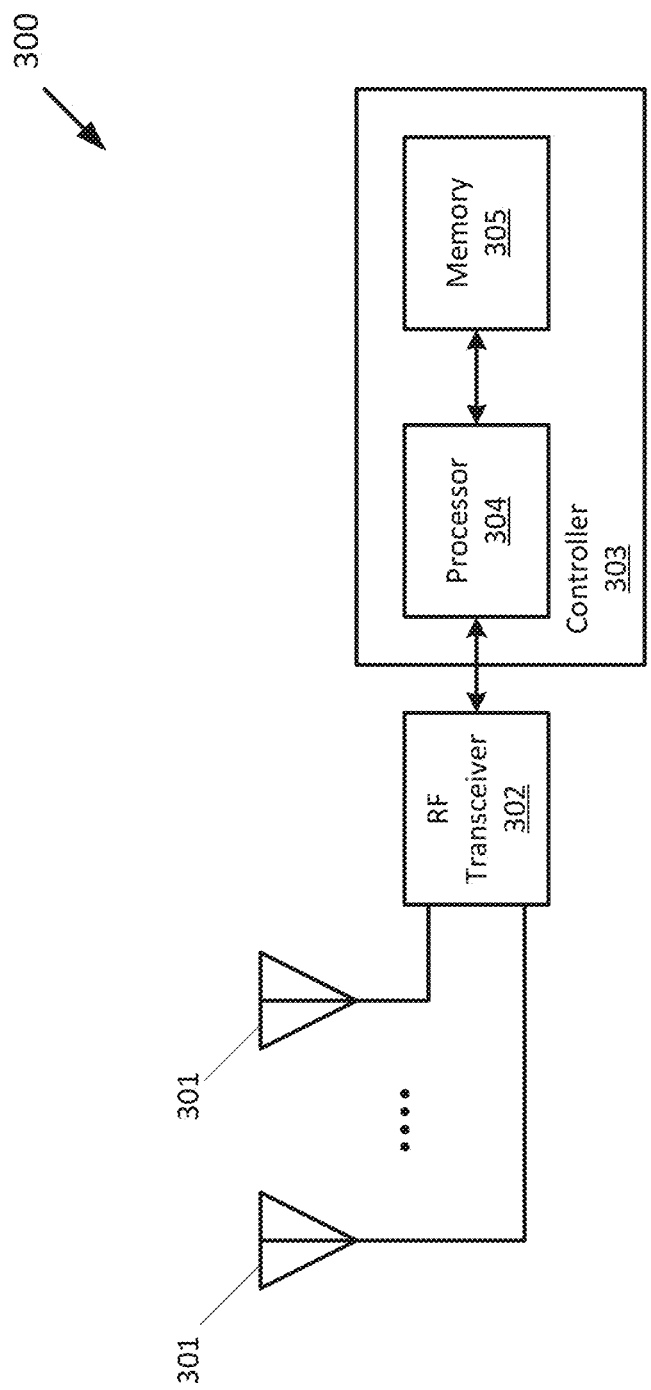
FIG. 3 is a block diagram illustrating an example WLAN station according to the present disclosure.

FIG. 3 is a block diagram 300 of an example WLAN station (STA) 300 according to the present disclosure. STA 300 includes one or more antennas 301 to receive one or more spatial streams from a wireless access point (AP), not shown. STA 300 also includes a radio frequency (RF) transceiver 302 coupled with the one or more antennas 301, to convert each of the one or more spatial streams into WLAN digital frames, such as example frame 100 described above. STA 300 also includes a controller 303 coupled to the transceiver 302 to process the digital frames. Controller 303 includes a processor 304 to process the digital frames and a memory 305 containing data and instructions used by the processor 304 to process the digital frames.

Figure 4:
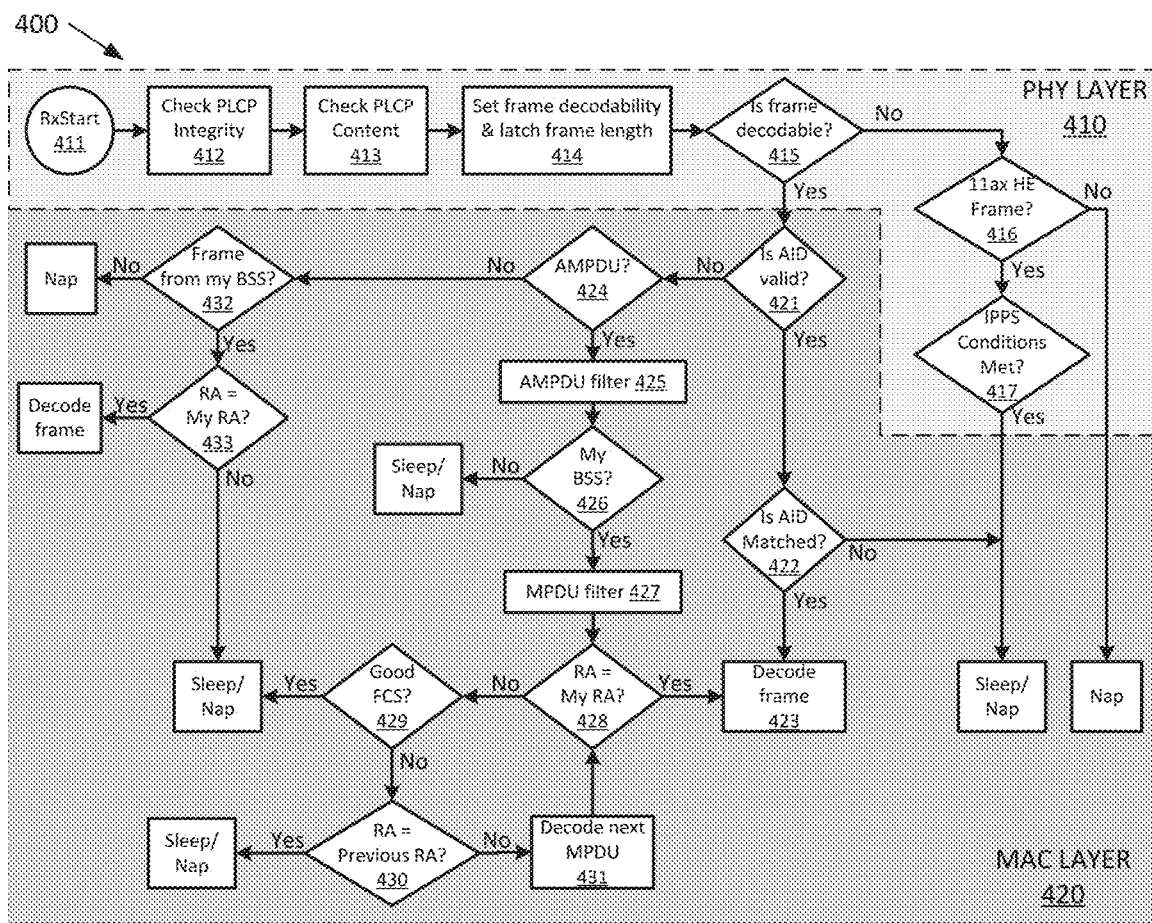
FIG. 4 is a flowchart illustrating an example method for processing WLAN frames according to the present disclosure.

FIG. 4 is a flowchart illustrating an example method 400 for processing WLAN frames in a WLAN station such as STA 300. Method 400 begins in the PHY Layer 410 when an internal signal RxStart goes high after the STA 300 is synchronized with the WLAN frame PHY layer preamble 120, and has read enough signaling data in signaling field 132 to begin checking the integrity of the PLCP header 130.

In a first PLCP integrity check, the processor 304 determines whether a signal-to-noise ratio (SNR) of a legacy signaling (L-SIG) field of the PLCP header is below a predetermined minimum SNR value required to decode data packets at any data rate. If the SNR is below the minimum SNR, then the frame is tagged as un-decodable. Although the example shows SNR computed on LSIG, it can be computed on HT-SIG (802.11n), VHT-SIG (802.11ac) independently or along with LSIG.

Figure 5:
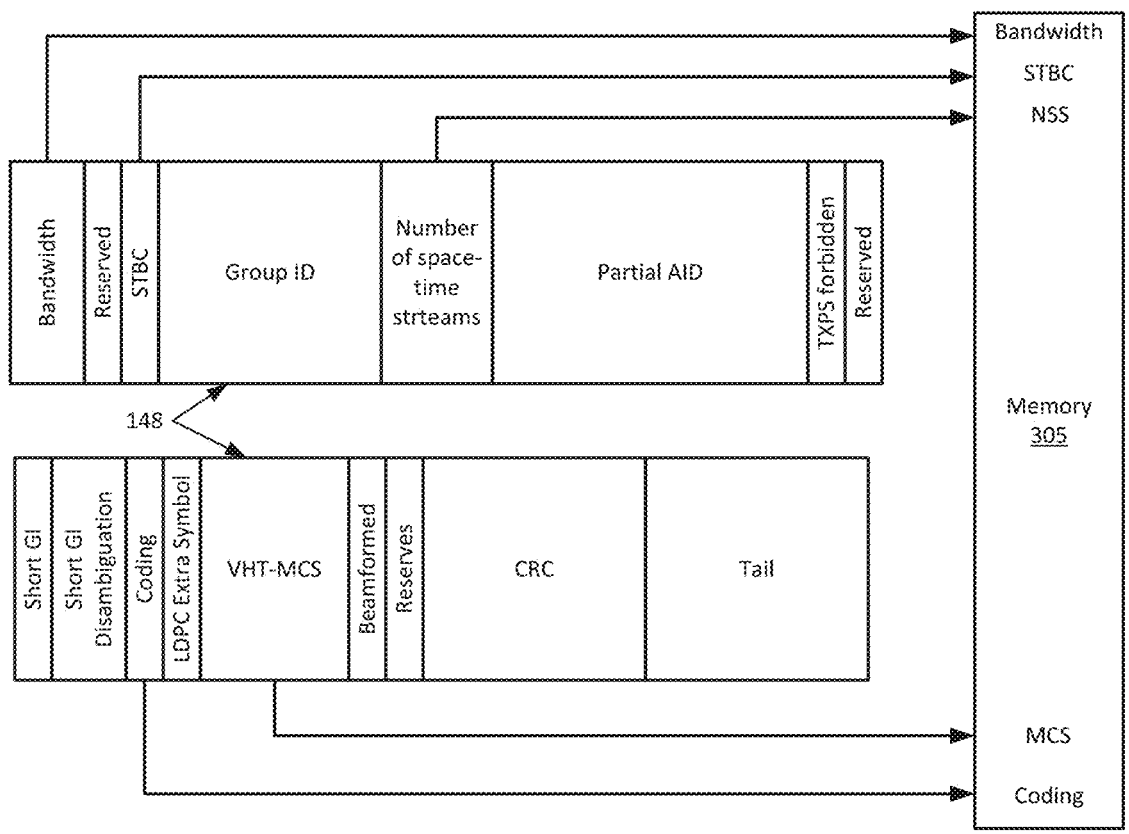
FIG. 5 is a datagram illustrating an example datagram of a signaling field according to the present disclosure.

In a second PLCP integrity check, the processor 304 determines whether the signal-to-noise ratio (SNR) of the appropriate signaling field (L-SIG 142, HT-SIG 145 or VHT-SIG 148) of the PLCP header is below a predetermined minimum SNR value required to decode data packets based on a modulation and coding scheme (MCS), a number of spatial streams (NSS) and a space-time block coding (STBC) configuration of the spatial streams obtained from the appropriate SIG field. This is illustrated in FIG. 5, where the subfields of an example VHT-SIG field 148 are expanded. As illustrated in FIG. 5, the subfields specifying Bandwidth, STBC, NSS, MCS and Coding are extracted from VHT-SIG 148 and stored in memory 305 for processing by processor 304. If the SNR is below the minimum SNR, the frame is tagged as un-decodable.

In a third PLCP header integrity check, the processor 304 determines from a channel estimate whether an RMS (root mean square) delay spread exceeds a predetermined maximum RMS delay spread. The channel estimate is a matrix H that models the amplitude and phase of the transmission channel between the STA 300 and its access point for each spatial stream and for each subcarrier (tone) in each spatial stream. If the RMS delay spread exceeds the maximum spread, then the frame is tagged as un-decodable.

In a fourth PLCP header integrity check, when the number of spatial streams is greater than one in a Multiple Input Multiple Output (MIMO) architecture, the processor 304 determines whether a channel condition number based on the channel estimate can support a data rate based on the MCS, the NSS and the STBC configuration. The condition number of the channel matrix H is a measure of how sensitive the output values of the channel matrix equation are to small changes in input values. In an IEEE 802.11 WLAN system, the received symbol vector Y is equal to HX, where X is the transmitted symbol vector and H is the channel matrix. To solve for X, the matrix H must be inverted to yield $X=H^{-1}Y$. The condition number of a matrix is approximated by the ratio of the largest singular value in the matrix to the smallest singular value in the matrix. A matrix with a low condition number is said to be well-conditioned where the output (dependent) variables have a low sensitivity to changes in the input (independent) variables, while a matrix with a high condition number is said to be ill-conditioned where the dependent variables have a high sensitivity to changes in the independent variables. Matrices with high condition numbers yield less accurate results than matrices with low condition numbers. In the case of the H matrix, a condition number above a given threshold means that the symbol error rate will be too high to decode the frame. If the processor determines that the condition number of the channel matrix exceeds a predetermined threshold, the frame is tagged as un-decodable.

Figure 6:
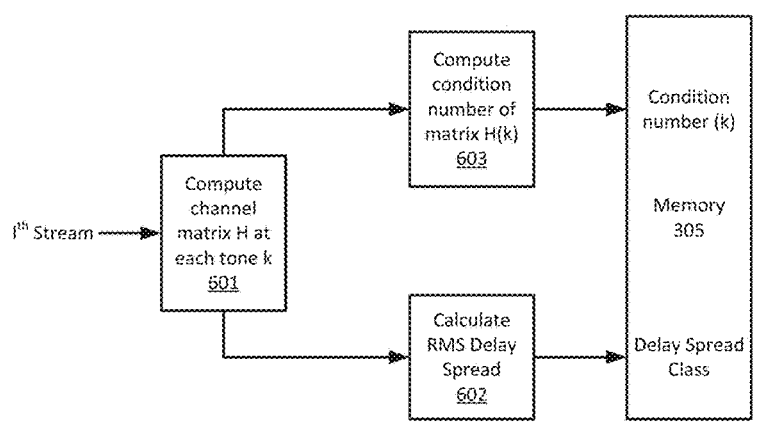
FIG. 6 is a block diagram illustrating an example of channel estimation according to the present disclosure.

These two channel estimate based processes (delay spread and condition number) are illustrated in FIG. 6. In FIG. 6, the processor 304 computes the channel matrix H for each tone for each data stream in operation 601. In operation 602, the processor 304 calculates the RMS delay spread for each data stream, and classifies the delay spread, which is stored in memory 305. In operation 603, the processor 304 computes the condition number of the channel matrix H for each tone in each data stream and stores the condition numbers in memory 305.

It the processor 304 determines that the frame is decodable under the four PLCP header integrity checks described above, then the next step in the method 400 (operation 413) is to check the validity of the contents of the PLCP header.

The processor 304 reads the SIG fields in the PLCP header to determine if there are invalid combinations of parameters that would render the frame un-decodable. Examples include, without limitation, an invalid rate/field combination in the L-SIG field 142 of an 802.11b/ag frame, an incompatible combination of an NSS value and an STBC value in the HT-SIG field 145 of an 802.11n frame, an incompatible single-user (SU) parameter and a group ID parameter in the VHT-SIG field of an 802.11ac frame 148, or an inconsistency between a bandwidth parameter and a coding scheme in an HE-SIG field of an 802.11ax frame.

If the frame fails the PHY layer integrity and validity tests, the frame is marked as non-decodable and the frame length is latched in memory at operation 414. In operation 415, any frame marked non-decodable is passed to operation 416, which determines if the frame is an HE frame compatible with 802.11ax. If not, the frame is dropped and the STA 300 enters a reduced power nap state for the duration of the frame. If the frame is an 802.11ax compatible HE frame, then the frame is tested against Intra-PPDU Power Save (IPPS) conditions in operation 417 that are unique to the IEEE 802.11ax standard. If the IPPS conditions are met, then the STA 300 enters a reduced power nap or sleep state for the duration of the frame.

The decision whether to enter a nap state or a sleep state depends on the remaining duration of the frame. If the remaining duration of the frame is less than the time required to completely power-down and power-up the radio frequency (RF) components in the STA 300, then the STA 300 enters a nap state where the RF components are duty-cycled for the duration of the frame. If the remaining duration of the frame is greater than the time required to power-down and power-up the RF components, then the STA 300 enters a sleep state where the RF components are powered down for the duration of the frame.

Returning to FIG. 4, if the frame is determined to be decodable at operation 415, the frame is passed to the MAC Layer 420 for further processing to determine if the frame is intended for the STA 300.

In operation 421, the AID field of the appropriate SIG field is examined to determine whether the AID (association identifier) field is valid. If the AID field is valid, and the AID matches a stored AID in operation 422, then the frame is decoded in operation 423. If the AID is valid but not matched, then the STA enters the reduced power (nap or sleep) state for the duration of the frame.

If, at operation 421, the AID is not valid, then the method determines at operation 424 if the frame is part of an aggregated MAC protocol data unit (AMPDU). If the answer is yes, then it is passed to an AMPDU filter in operation 425 to extract the BSSID (basic service set identifier). If the processor 304 determines the STA 300 is not a member of the BSS in operation 426, the STA 300 enters the reduced power state for the duration of the frame. If the processor 304 determines it is a member of the BSS at operation 426, the frame is passed to an MPDU (MAC protocol date unit) filter 427, which extracts the receiver address (RA) from the MAC header 150. If the processor 304 determines, in operation 428 that the RA matches the MAC address of the STA 300, then the frame is decoded in operation 423.

If the processor 304 determines, in operation 428 that the RA does not match the MAC address of the STA 300, then the processor 304 determines if the FCS 160 of the MAC header is good in operation 429. If the FCS 190 is good, then the STA 300 enters the reduced power state for the duration of the frame. If the FCS 160 is not good, then the processor determines, in operation 430, if the current RA matches the previous (invalid) RA. If the current RA matches the previous RA in operation 430, then the STA 300 enters the reduced power state for the duration of the frame. If the current RA does not match the previous RA, then the processor decodes the next MPDU in operation 431 and closes the loop on operation 428.

Returning to operation 424, if the processor 304 determines that the frame is not part of an AMPDU, then the processor extracts the BSSID at operation 432 and determines if the STA 300 is a member of the BSS. If the STA 300 is not a member of the BSS, then the STA 300 enters the reduced power state for the duration of the frame. If the STA 300 is a member of the BSS, then the processor 304 determines if the RA matches the MAC address of the STA 300 in operation 433. If the RA matches the MAC address of the STA 300, then the processor 304 decodes the frame. If the RA does not match the MAC address of the STA 300, then the STA 300 enters the reduced power state.

As described above, the reduced power state of the STA 300 may take two forms; a NAP state and a SLEEP state. A timing diagram for an example NAP state 700 is illustrated in FIG. 7, and a timing diagram for an example sleep state 800 is illustrated in FIG. 8.

Figure 7:
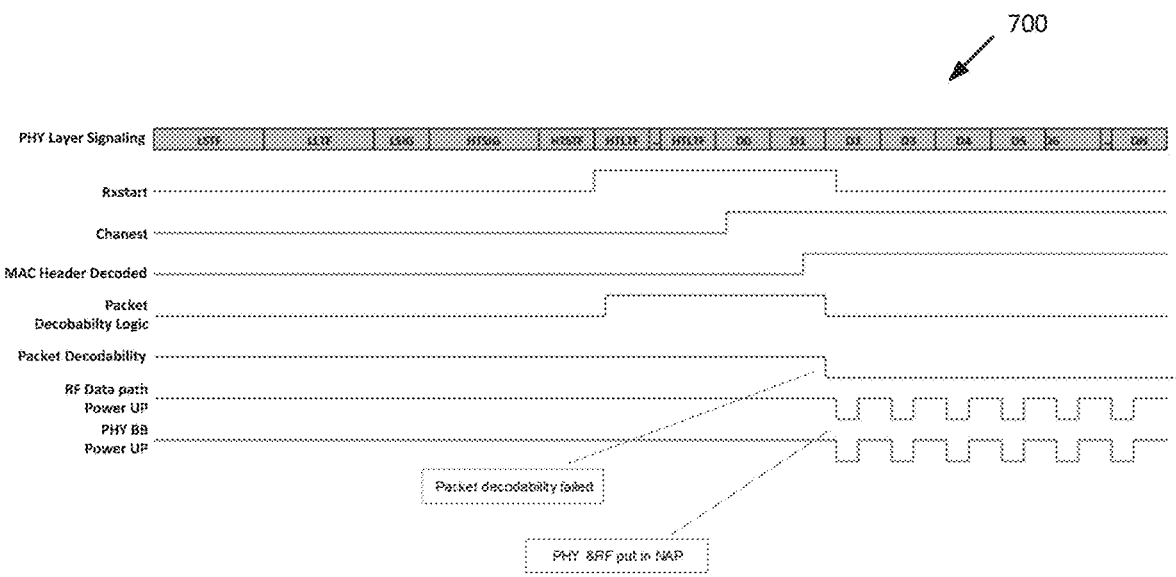
FIG. 7 is a timing diagram illustrating an example of power saving in WLAN frame processing according to the present disclosure.

FIG. 7 illustrates the transition to a NAP state for the case of an example 802.11n frame 700. As illustrated in FIG. 7, the RxStart (receive start) signal goes high after a CRC checksum for the L-SIG field is validated. This signal triggers the start of the packet decodability logic described in detail above. After all of the training fields have been processed, the channel estimate is generated and used by the decodability logic as described above to calculate the RMS delay spread 602 and/or the condition number in the case of a MIMO system. After the MAC header is decoded as part of processing data field DO, the MAC Header Decoded signal goes high an d the packet decodability logic completes and its signal goes low. If the decodability logic determines that the frame is not decodable or addressed to the STA 300, then packet decodability signal goes low, and in the example of FIG. 7, the STA 300 enters the nap state for the duration of the frame, as described above if the remaining frame duration is less than the time required to fully power-down and power-up the RF data path.

Figure 8:
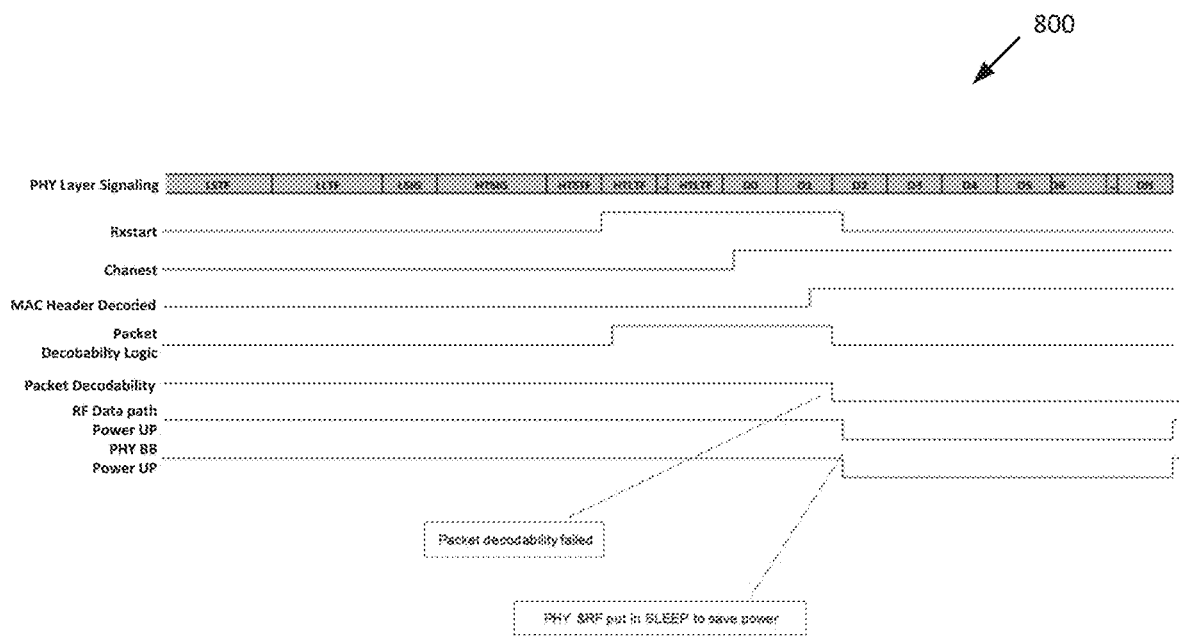
FIG. 8 is a timing diagram illustrating an example of power saving in WLAN frame processing according to the present disclosure.

FIG. 8 illustrates the transition to a SLEEP state for the case of an example 802.11n frame 800. FIG. 8 is similar in all respects to FIG. 7 except that it is assumed for the sake of example that the remaining duration of the frame is long enough so there is enough time to fully power-down and power-up the RY/PHY data path before the next frame is received.

The preceding description sets forth numerous specific details such as examples of specific systems, components, methods, and so forth, in order to provide a thorough understanding of several examples in the present disclosure. It will be apparent to one skilled in the art, however, that at least some examples of the present disclosure may be practiced without these specific details. In other instances, well-known components or methods are not described in detail or are presented in simple block diagram form in order to avoid unnecessarily obscuring the present disclosure. Thus, the specific details set forth are merely exemplary. Particular examples may vary from these exemplary details and still be contemplated to be within the scope of the present disclosure.

Any reference throughout this specification to "one example" or "an example" means that a particular feature, structure, or characteristic described in connection with the examples are included in at least one example. Therefore, the appearances of the phrase "in one example" or "in an example" in various places throughout this specification are not necessarily all referring to the same example.

Although the operations of the methods herein are shown and described in a particular order, the order of the operations of each method may be altered so that certain operations may be performed in an inverse order or so that certain operation may be performed, at least in part, concurrently with other operations. Instructions or sub-operations of distinct operations may be performed in an intermittent or alternating manner.

The above description of illustrated examples of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. As used in this application, the terms "coupled to" or "coupled with" in the context of connected components or systems, includes both directly coupled components or systems, and components or systems that are indirectly coupled through other components, systems of interfaces.

What is claimed is:

1. A method, comprising:
   receiving an IEEE 802.11 frame at a wireless local area network (WLAN) station;
   determining whether the IEEE 802.11 frame is decodable by performing signal integrity checks of a physical layer convergence protocol (PLCP) header of the IEEE 802.11 frame;
   determining whether the IEEE 802.11 frame is un-decodable due to frame error by checking the PLCP header of the IEEE 802.11 frame;
   determining whether the IEEE 802.11 frame is addressed to the WLAN station when the IEEE 802.11 frame is determined to be decodable; and
   entering a reduced power state when the IEEE 802.11 frame is not un-decodable or not addressed to the WLAN station.

2. The method of claim 1, wherein determining whether the IEEE 802.11 frame is decodable comprises:
   determining whether a combination of parameters in a signaling field of the PLCP header is valid.

3. The method of claim 2, wherein performing signal integrity checks of the PLCP header comprises one or more of:
   determining whether a signal-to-noise ratio (SNR) of a signaling field of the PLCP header is below a predetermined minimum SNR value required to decode data packets at any data rate;
   determining whether the SNR of a signaling field of the PLCP header is below a predetermined minimum SNR value required to decode data packets based on a modulation and coding scheme (MCS), a number of spatial streams (NSS) and a space-time block coding (STBC) configuration of the number of spatial streams obtained from the signaling field,
   determining from a channel estimate whether a root mean square (RMS)) delay spread exceeds a predetermined maximum RMS delay spread; and
   determining whether a channel condition number based on the channel estimate can support a data rate based on the MCS, the NSS and the STBC configuration.

4. The method of claim 2, wherein an invalid combination of parameters in the signaling field of the PLCP header comprises one or more of:
   an invalid rate field combination in a legacy signaling (L-SIG) field;
   a mismatch between a number of spatial streams (NSS) field and a space-time block coding (STBC) field in a high throughput signaling (HT-SIG) field; and
   a mismatch between a single-user (SU) field and a group ID (GID) field in a very high throughput (VHT) field.

5. The method of claim 1, wherein determining whether the IEEE 802.11 frame is addressed to the WLAN station comprises:
   determining whether the WLAN station is a member of a basic service set (BSS) identified by a basic service set identifier (BSSID) in a medium access control (MAC) header of the IEEE 802.11 frame; and
   determining whether a receiver address (RA) in the MAC header of the IEEE 802.11 frame matches a MAC address of the WLAN station.

6. The method of claim 1, wherein entering the reduced power state comprises entering one of a sleep state or a nap state for a remaining duration of the IEEE 802.11 frame, based on a frame duration field in the MAC header.

7. The method of claim 6, wherein entering the nap state comprises duty-cycling a PHY/RF data path for the remaining duration of the IEEE 802.11 frame, and wherein entering the sleep state comprises powering down the PHY/RF data path for the remaining duration of the IEEE 802.11 frame.

8. A wireless local area network (WLAN) controller comprising:
   a memory containing instructions; and
   a processor coupled with the memory, the processor to execute the instructions to cause the WLAN controller to:
      receive an IEEE 802.11 frame;
      determine whether the IEEE 802.11 frame is decodable by performing signal integrity checks of a physical layer convergence protocol (PLCP) header of the IEEE 802.11 frame;

determine whether the IEEE 802.11 frame is un-decodable due to frame error by checking the PLCP header of the IEEE 802.11 frame;

determine whether the IEEE 802.11 frame is addressed to the WLAN controller when the IEEE 802.11 frame is determined to be decodable; and enter a reduced power state ifwhen the frame is not un-decodable or not addressed to the WLAN controller.

9. The WLAN controller of claim 8, wherein to determine whether the IEEE 802.11 frame is decodable, the processor is to:

determine whether a combination of parameters in a signaling field of the PLCP header is valid.

10. The WLAN controller of claim 9, wherein to perform signal integrity checks of the PLCP header comprises one or more of:

determine whether a signal-to-noise ratio (SNR) of a signaling field of the PLCP header is below a predetermined minimum SNR value required to decode data packets at any data rate;

determine whether the SNR of the signaling field of the PLCP header is below a predetermined minimum SNR value required to decode data packets based on a modulation and coding scheme (MCS), a number of spatial streams (NSS) and a space-time block coding (STBC) configuration of the number of spatial streams;

determine from a channel estimate whether a root mean square (RMS) delay spread of the channel exceeds a predetermined maximum RMS delay spread; and determine whether a channel condition number based on the channel estimate can support a data rate based on the MCS, the NSS and the STBC configuration.

11. The WLAN controller of claim 9, wherein an invalid combination of parameters in the signaling field of the PLCP header comprises one or more of:

an invalid rate field combination in a legacy signaling (L-SIG) field;

a mismatch between a number of spatial streams (NSS) field and a space-time block coding (STBC) field in a high throughput signaling (HT-SIG) field; and a mismatch between a single-user (SU) field and a group ID (GID) field in a very high throughput (VHT) field.

12. The WLAN controller of claim 8, wherein to determine whether the IEEE 802.11 frame is addressed to the WLAN controller, the processor is to:

determine whether the WLAN controller is a member of a basic service set (BSS) identified by a basic service set identifier (BSSID) in a medium access control (MAC) header of the IEEE 802.11 frame; and determine whether a receiver address (RA) in the MAC header of the IEEE 802.11 frame matches a MAC address of the WLAN controller.

13. The WLAN controller of claim 8, wherein to enter the reduced power state, the processor is to enter one of a sleep state or a nap state for a remaining duration of the IEEE 802.11 frame, based on a frame duration field in the MAC header.

14. The WLAN controller of claim 13, wherein to enter the nap state, the processor is to duty-cycle a PHY/RF data path for the remaining duration of the IEEE 802.11 frame, and wherein to enter the sleep state, the processor is to power down the PHY/RF data path for the remaining duration of the IEEE 802.11 frame.

15. A system, comprising:
at least one antenna to receive an IEEE 802.11 frame; and a wireless local area network (WLAN) controller comprising a processor to:

determine whether the IEEE 802.11 frame is decodable by performing signal integrity checks of a physical layer convergence protocol (PLCP)header of the IEEE 802.11 frame;

determine whether the IEEE 802.11 frame is un-decodable due to frame error by checking the PLCP header of the IEEE 802.11 frame;

determine whether the IEEE 802.11 frame is addressed to the WLAN controller when the IEEE 802.11 frame is determined to be decodable; and enter a reduced power state ifwhen the IEEE 802.11 frame is not un-decodable or not addressed to the WLAN controller.

16. The system of claim 15, wherein to determine whether the IEEE 802.11 frame is decodable, the processor is to:

determine whether a combination of parameters in a signaling field of the PLCP header is valid.

17. The system of claim 16, wherein to perform signal integrity checks of the PLCP header comprises one or more of:

determine whether a signal-to-noise ratio (SNR) of a signaling field of the PLCP header is below a predetermined minimum SNR value required to decode data packets at any data rate;

determine whether the SNR of the signaling field of the PLCP header is below a predetermined minimum SNR value required to decode data packets based on a modulation and coding scheme (MCS), a number of spatial streams (NSS) and a space-time block coding (STBC) configuration of the number of spatial streams;

determine from a channel estimate whether a root mean square (RMS) delay spread of the channel exceeds a predetermined maximum RMS delay spread; and determine whether a channel condition number based on the channel estimate can support a data rate based on the MCS, the NSS and the STBC configuration.

18. The system of claim 16, wherein an invalid combination of parameters in the signaling field of the PLCP header comprises one or more of:

an invalid rate field combination in a legacy signaling (L-SIG) field;

a mismatch between a number of spatial streams (NSS) field and a space-time block coding (STBC) field in a high throughput signaling (HT-SIG) field; and a mismatch between a single-user (SU) field and a group ID (GID) field in a very high throughput (VHT) field.

19. The system of claim 15, wherein to determine whether the IEEE 802.11 frame is addressed to the WLAN controller, the processor is to:

determine whether the WLAN controller is a member of a basic service set (BSS) identified by a basic service set identifier (BSSID) in a medium access control (MAC) header of the IEEE 802.11 frame; and determine whether a receiver address (RA) in the MAC header of the IEEE 802.11 frame matches a MAC address of the WLAN controller.

20. The system of claim 15, wherein to enter the reduced power state, the processor is to enter one of a sleep state or a nap state for a remaining duration of the IEEE 802.11 frame, based on a frame duration field in the MAC header.

21. The system of claim 20, wherein to enter the nap state, the processor is to duty- cycle a PHY/RF data path for the remaining duration of the IEEE 802.11 frame, and wherein to enter the sleep state, the processor is to power down the PHY/RF data path for the remaining duration of the IEEE 802.11 frame.

\* \* \* \* \*